US012294155B2

(12) United States Patent
Charaabi et al.

(10) Patent No.: US 12,294,155 B2
(45) Date of Patent: May 6, 2025

(54) ANTENNA APPARATUS

(71) Applicant: Nokia Shanghai Bell Co., Ltd., Shanghai (CN)

(72) Inventors: Zied Charaabi, Lannion (FR); Jerome Plet, Louannec (FR); Jean-Pierre Harel, Lannion (FR); Azzeddin Naghar, Lannion (FR); Arsene Dagan, Lannion (FR); Jonathan Bor, Perros-Guirec (FR)

(73) Assignee: Nokia Shanghai Bell Co. Ltd., Shanghai (CN)

( * ) Notice: Subject to any disclaimer, the term of this patent is extended or adjusted under 35 U.S.C. 154(b) by 77 days.

(21) Appl. No.: 17/376,245

(22) Filed: Jul. 15, 2021

(65) Prior Publication Data

US 2022/0021129 A1 Jan. 20, 2022

(30) Foreign Application Priority Data

Jul. 17, 2020 (GB) ..................................... 2011067

(51) Int. Cl.

| | |
|---|---|
| ***H01Q 21/24*** | (2006.01) |
| ***H01Q 1/24*** | (2006.01) |
| ***H01Q 5/40*** | (2015.01) |
| ***H01Q 19/10*** | (2006.01) |
| ***H01Q 21/30*** | (2006.01) |

(52) U.S. Cl.

CPC ............. *H01Q 21/24* (2013.01); *H01Q 1/246* (2013.01); *H01Q 5/40* (2015.01); *H01Q 19/108* (2013.01); *H01Q 21/30* (2013.01)

(58) Field of Classification Search

CPC ...... H01Q 21/062; H01Q 9/18; H01Q 21/061; H01Q 21/225; H01Q 21/065; H01Q 21/24; H01Q 1/246; H01Q 5/40; H01Q 19/108; H01Q 21/30

See application file for complete search history.

(56) References Cited

U.S. PATENT DOCUMENTS 10,680,347 B2 * 6/2020 Jang ........................ H01Q 21/30
10,741,906 B2 * 8/2020 Gomez Angulo ....... H01Q 5/42
(Continued)

FOREIGN PATENT DOCUMENTS

CN 102832455 A 12/2012
CN 104067442 A 9/2014
(Continued)

*Primary Examiner* — Dameon E Levi
*Assistant Examiner* — Leah Rosenberg
(74) *Attorney, Agent, or Firm* — McCarter & English, LLP

(57) ABSTRACT

An apparatus including a first antenna array including first radiators arranged at a plurality of vertices defining a first shape; and a second antenna array including second radiators arranged at a plurality of vertices defining a second shape, wherein a first subset and a second subset of the first radiators are configured to operate at different polarizations, wherein a first subset and a second subset of the second radiators are configured to operate at different polarizations, and wherein the first shape and the second shape partially overlap, wherein a radiator of the first radiators is within an area defined by the second shape, and one or more other radiators of the first radiators are outside the area defined by the second shape.

20 Claims, 9 Drawing Sheets

(56) References Cited

U.S. PATENT DOCUMENTS

| | | | | |
|---|---|---|---|---|
| 2009/0278759 | A1* | 11/2009 | Moon | H01Q 21/26 343/810 |
| 2013/0002505 | A1* | 1/2013 | Teillet | H01Q 1/246 343/835 |
| 2014/0111396 | A1 | 4/2014 | Hyjazie et al. | 343/798 |
| 2018/0097293 | A1* | 4/2018 | Piegsa | H01Q 5/392 |
| 2018/0287268 | A1* | 10/2018 | Kosaka | H01Q 13/10 |
| 2018/0294578 | A1* | 10/2018 | Xiao | H01Q 5/307 |
| 2019/0103911 | A1* | 4/2019 | Gharavi | H04B 7/15507 |
| 2019/0273315 | A1 | 9/2019 | Hu et al. | |
| 2020/0052388 | A1* | 2/2020 | Jang | H01Q 1/422 |
| 2020/0076092 | A1* | 3/2020 | Chiang | H01Q 9/0407 |
| 2020/0106158 | A1* | 4/2020 | Gomez Angulo | G06F 1/1698 |
| 2021/0021046 | A1* | 1/2021 | Rashid | H01Q 1/38 |
| 2023/0076013 | A1* | 3/2023 | Moallem | H01Q 21/24 |
| 2024/0283164 | A1* | 8/2024 | Ai | H01Q 9/44 |

FOREIGN PATENT DOCUMENTS

| | | | | |
|---|---|---|---|---|
| CN | 104685718 | A | 6/2015 | |
| CN | 205657182 | U | 10/2016 | |
| EP | 3 089 270 | A1 | 11/2016 | |
| KR | 2010/0033888 | A | 3/2010 | |
| WO | WO-2018201223 | A1 * | 11/2018 | H01P 5/028 |

* cited by examiner

ANTENNA APPARATUS

TECHNOLOGICAL FIELD

Some embodiments of the present disclosure relate to antenna apparatus.

BACKGROUND

An antenna apparatus is configured to operate in one or more operational frequency bands. Radiators of the antenna apparatus that operate in different frequency bands are physically separated from each other in order to achieve targeted performances. For example, radiators can be spaced apart over a large array. The width of an array depends on the number of columns of radiators. The number of columns of radiators depends on the required number of frequency bands.

BRIEF SUMMARY

According to various, but not necessarily all, embodiments of the invention there is provided an apparatus comprising:

a first antenna array comprising first radiators arranged at a plurality of vertices defining a first shape; and a second antenna array comprising second radiators arranged at a plurality of vertices defining a second shape, wherein a first subset and a second subset of the first radiators are configured to operate at different polarizations, wherein a first subset and a second subset of the second radiators are configured to operate at different polarizations, and wherein the first shape and the second shape partially overlap, wherein a radiator of the first radiators is within an area defined by the second shape, and one or more other radiators of the first radiators are outside the area defined by the second shape.

According to various, but not necessarily all, embodiments there is provided a cellular base station comprising the antenna apparatus.

According to various, but not necessarily all, embodiments there is provided examples as claimed in the appended claims.

BRIEF DESCRIPTION

Some examples will now be described with reference to the accompanying drawings in which.

DETAILED DESCRIPTION

Figure 1:
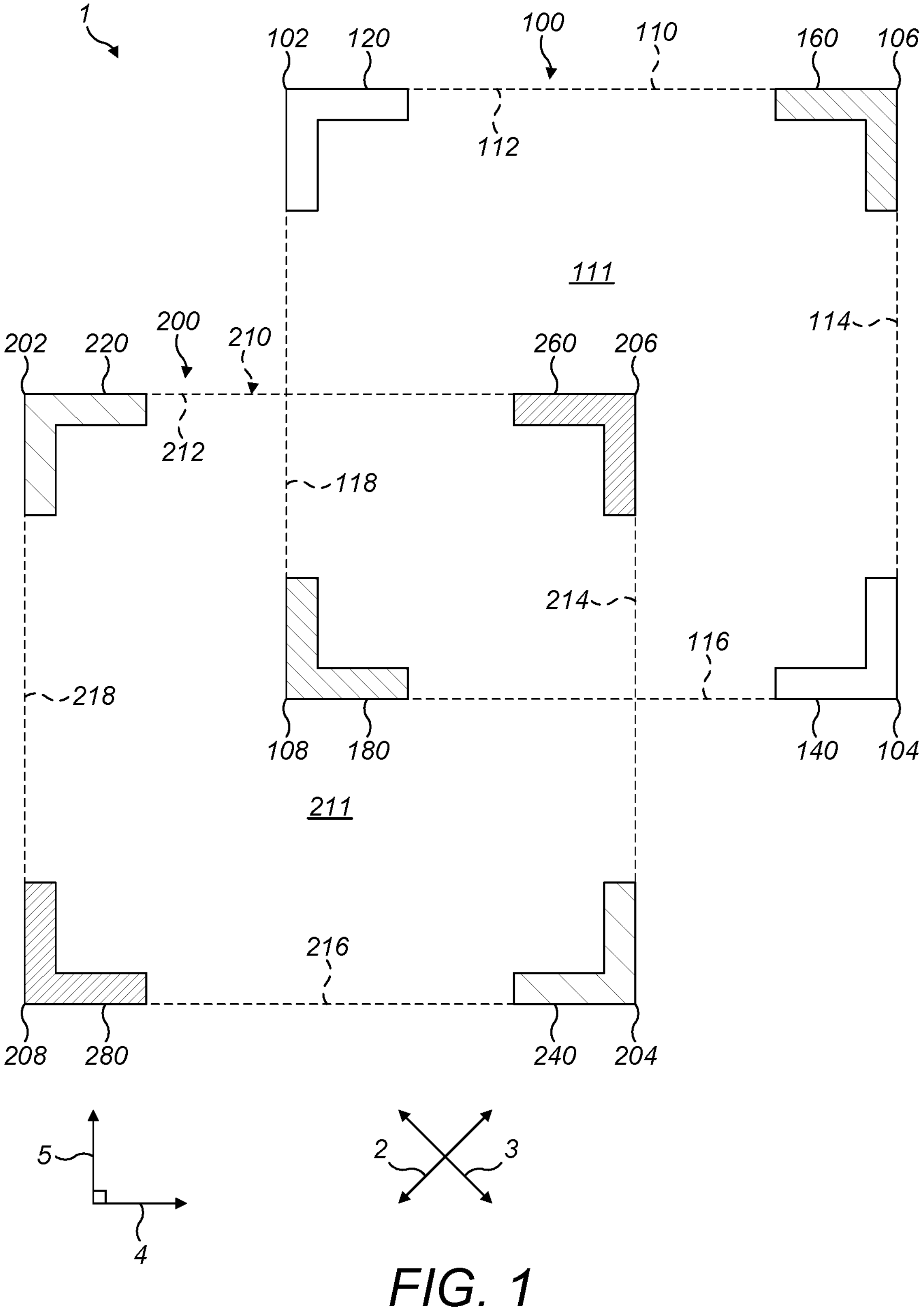
FIG. 1 shows an example embodiment of the subject matter described herein.

The Figures and following description relate to an apparatus 1. The apparatus 1 may be an antenna apparatus. The antenna apparatus comprises:

a first antenna array 100 comprising first radiators 120, 140, 160, 180 arranged at a plurality of vertices 102, 104, 106, 108 (corners) defining a first shape 110; and a second antenna array 200 comprising second radiators 220, 240, 260, 280 arranged at a plurality of vertices 202, 204, 206, 208 defining a second shape 210, wherein a first subset (one or more) 120, 140 and a second subset 160, 180 of the first radiators are configured to operate at different polarizations, wherein a first subset 220, 240 and a second subset 260, 280 of the second radiators are configured to operate at different polarizations, and wherein the first shape 110 and the second shape 210 partially overlap, wherein a radiator (e.g. 180) of the first radiators is within an area 211 defined by the second shape 210, and one or more other radiators 120, 140, 160 of the first radiators are outside the area 211 defined by the second shape 210.

FIG. 1 is a schematic illustration of an antenna apparatus 1 as described above, in plan-view looking down on a plane defined by a first direction 5 and a second orthogonal direction 4.

As shown, the shapes 110, 210 partially overlap and do not fully overlap. In at least some examples the partial overlap of the shapes 110, 210 is corner overlap, wherein the corner of one of the shapes is intertwined with the corner of the other of the shapes.

Corner overlap is partial overlap in the first direction 5 and partial overlap in the second direction 4.

The partial overlap reduces the overall width of the antenna apparatus 1 in the first direction 5, and in at least some examples also reduces the overall length of the antenna apparatus 1 in the second direction 4. In an implementation, the reduced width may be less than approximately 40 centimetres. This results in a more compact and lightweight apparatus with high radiation efficiency, that encounters less wind loading if located outdoors. Environmental benefits include high radiation efficiency and less material required to construct the antenna apparatus 1.

As will be clear from the following description and the Figures, the radiators are spread out despite the narrow width of the antenna apparatus 1, which enables a usefully narrow horizontal beamwidth and high gain to be maintained. By contrast, if the width of the antenna is reduced in a manner that brings radiators too close together, horizontal beamwidth would increase which reduces gain.

In at least some examples the shapes 110, 210 are quadrilaterals, defined by four vertices. FIG. 1 shows square/rectangular shapes with overlapping corners. In other examples one or both of the shapes 110, 210 could have a different number of vertices.

A detailed description of the optional geometry of the first antenna array 100 of FIG. 1 is provided below. FIG. 1 specifically illustrates the radiators belonging to the first antenna array 100 comprising:

a first radiator 120 at a first vertex 102 of the first shape 110, extending partway along a first edge 112 of the first shape and extending partway in a different non-parallel direction along a fourth edge 118 of the first shape 110;

a second radiator 140 at a second vertex 104 of the first shape 110, diagonally separated from the first vertex 102, wherein the second radiator 140 extends partway along a second edge 114 of the first shape and extends partway in a different nonparallel direction along a third edge 116 of the first shape 110;

a third radiator 160 at a third vertex 106 of the first shape 110, extending partway along the first edge 112 and extending partway in a different nonparallel direction along the second edge 114; and a fourth radiator 180 at the fourth vertex 108 of the first shape 110, diagonally separated from the third vertex 106, wherein the fourth radiator 180 extends partway along the third edge 116 and extends partway in a different nonparallel direction along the fourth edge 118.

The term diagonal refers to any pair of vertices not on the same edge of a shape. In at least some examples the term diagonal further indicates that the pair of vertices are separated in the first direction 5 and separated in the second direction 4.

The first edge 112 connects the first vertex 102 and the third vertex 106. The second edge 114 connects the third vertex 106 and the second vertex 104. The third edge 116 connects the second vertex 104 and the fourth vertex 108. The fourth edge 118 connects the fourth vertex 108 and the first vertex 102.

The first edge 112 may extend along the second direction 4. The second edge 114 may extend along the first direction 5. The third edge 116 may extend along the second direction 4. The fourth edge 118 may extend along the first direction 5. The edges 112, 114, 116, 118 may either form a parallelogram or the shape 110 may be skewed due to staggering of the radiators.

In plan-view, individual radiators (e.g. 120) are folded at a vertex (e.g. 102) and extend towards two adjacent vertices (e.g. 106, 108) to define portions of edges (e.g. 112, 118) of the first shape 110. In the illustration, but not necessarily all examples, the radiators 120, 140, 160, 180 appear as L-shaped corners in plan-view.

In at least some examples the edges 112, 114, 116, 118 of the first shape 110 are not continuous edges. This is shown in FIG. 1 by dotted lines connecting the vertices 102, 104, 106, 108, wherein a dotted line indicates a part of an edge that is vacant space. Radiators (e.g. 120, 180) at adjacent vertices (e.g. 102, 108) extend towards each other along a common edge (e.g. 118), but do not meet. One or both of the radiators at adjacent vertices may not extend as far as the edge centre of the common edge.

The direction of polarization can be configured based on the geometries of the radiators, the selection of subsets of radiators to feed, and the directions in which said radiators are separated from each other.

For example, the first radiator 120 and the second radiator 140 form the first subset of radiators of the first antenna array 100, configured to operate at a first polarization 2. The antenna apparatus 1 may be configured to feed the first subset of radiators 120, 140 a common signal, e.g. via a radio frequency (RF) splitter (not shown). The radiators 120, 140 of the first subset are shaded white in FIG. 1. The first radiator 120 and second radiator 140 are at diagonally opposite vertices 102, 104 of the first shape 110.

In at least some examples the first polarization 2 is angled with respect to the first direction 5 and the second direction 4. For example, the first radiator 120 and second radiator 140 may be physically separated at a diagonal direction of approximately −45 degrees, and the first polarization 2 may be angled at approximately +45 degrees. The first polarization 2 is orthogonal to the physical direction in which the radiators 120, 140 are separated.

The third radiator 160 and the fourth radiator 180 form the second subset of radiators of the first antenna array 100, configured to operate at a second polarization 3. The second subset is hatch-shaded in FIG. 1. The third radiator 160 and fourth radiator 180 are separated from each other in a second diagonal direction, orthogonal to the diagonal direction of the first subset of radiators 120, 140. The second polarization 3 may be orthogonal to the first polarization 2. In the Figures, the third radiator 160 and fourth radiator 180 are at diagonally opposite vertices 106, 108 of the first shape 110.

The antenna apparatus 1 may be configured to feed the second subset of radiators 160, 180 a common signal. In a polarization diversity mode, the common signal fed to the second subset of radiators 160, 180 may be the same as the common signal fed to the first subset of radiators 120, 140. In a separate-channel mode, the first subset and second subset may be fed different signals, with minimal interference between the first subset of radiators 120, 140 and the second subset of radiators 160, 180.

In at least some examples the second polarization 3 is angled with respect to the first direction 5 and the second direction 4. The second polarization 3 may be orthogonal to the first polarization 2. For example, the third radiator 160 and fourth radiator 180 may be physically separated at a diagonal of approximately +45 degrees, and the second polarization 3 may be angled at approximately −45 degrees.

In FIG. 1, but not necessarily all examples, the fourth vertex 108 of the first shape 110 is within the area 211 defined by the second shape 210, as a result of the partial overlap of the antenna arrays 100, 200. In this example, but not necessarily all examples, a radiator is present at the fourth vertex 108, in this case the fourth radiator 180. The fourth radiator 180 is therefore an example of one radiator of one shape 110 being within the area 211 defined by the other shape 210.

In the above example, the first, second and third vertices 102, 104, 106 of the first shape 110 are outside the area 211 defined by the second shape 210.

In at least some examples the first antenna array 100 is configured to operate in a first frequency band. The specific frequency band depends on implementation. In some, but not necessarily all examples, the first frequency band may be within or cover a low band (e.g. first frequency band <1 GHz, for example, 0.7 to 0.96 GHz).

In some, but not necessarily all examples, the first subset 120, 140 and second subset 160, 180 of radiators of the first antenna array 100 are configured to operate at the same sub-bands within the first frequency band.

A detailed description of the optional geometry of the second antenna array 200 of FIG. 1 is provided below. FIG. 1 specifically illustrates the radiators belonging to the second antenna array 200 comprising:

a first radiator 220 at a first vertex 202 of the second shape 210, extending partway along a first edge 212 of the second shape 210 and extending partway in a different nonparallel direction along a fourth edge 218 of the second shape 210;

a second radiator 240 at a second vertex 204 of the second shape 210, diagonally separated from the first vertex 202, wherein the second radiator 240 extends partway along a second edge 214 of the second shape 210 and extends partway in a different nonparallel direction along a third edge 216 of the second shape 210;

a third radiator 260 at a third vertex 206 of the second shape 210, extending partway along the first edge 212 and extending partway in a different nonparallel direction along the second edge 214; and a fourth radiator 280 at the fourth vertex 208 of the second shape 210, diagonally separated from the third vertex 206, wherein the fourth radiator 280 extends partway along the fourth edge 218 and extends partway in a different nonparallel direction along the third edge 216.

The term diagonal refers to any pair of vertices not on the same edge of a shape. In at least some examples the term diagonal further indicates that the pair of vertices are separated in the first direction 5 and separated in the second direction 4.

The first edge 212 connects the first vertex 202 and the third vertex 206. The second edge 214 connects the third vertex 206 and the second vertex 204. The third edge 216 connects the second vertex 204 and the fourth vertex 208. The fourth edge 218 connects the fourth vertex 208 and the first vertex 202.

The first edge 212 may extend along the second direction 4. The second edge 214 may extend along the first direction 5. The third edge 216 may extend along the second direction 4. The fourth edge 218 may extend along the first direction 5. The edges 212, 214, 216, 218 may either form a parallelogram or the second shape 210 may be skewed due to staggering of the radiators.

In plan-view, individual radiators (e.g. 220) are folded at a vertex (e.g. 202) and extend towards two adjacent vertices (e.g. 206, 208) to define portions of edges (e.g. 212, 218) of the second shape 210. In the illustration, but not necessarily all examples, the radiators 220, 240, 260, 280 appear as L-shaped corners in plan-view.

In at least some examples the edges 212, 214, 216, 218 of the second shape 210 are not continuous edges. This is shown in FIG. 1 by dotted lines connecting the vertices 202, 204, 206, 208, wherein a dotted line indicates a part of an edge that is vacant space. Radiators (e.g. 220, 280) at adjacent vertices (e.g. 202, 208) extend towards each other along a common edge (e.g. 218), but do not meet. One or both of the radiators at adjacent vertices may not extend as far as the edge centre of the common edge.

The direction of polarization of the second antenna array 200 can be configured based on the geometries of the radiators, the selection of subsets of radiators to feed, and the direction in which said radiators are separated from each other.

For example, the first radiator 220 and the second radiator 240 form the first subset of radiators of the second antenna array 200, configured to operate at the first polarization 2. The antenna apparatus 1 may be configured to feed the first subset of radiators 220, 240 a common signal. The first subset 220, 240 is shaded grey in FIG. 1. The first radiator 220 and second radiator 240 are at diagonally opposite vertices 202, 204 of the second shape 210.

The third radiator 260 and the fourth radiator 280 form the second subset of radiators of the second antenna array 200, configured to operate at the second polarization 3. The second subset is shaded with a different hatch shading than the first subset, in FIG. 1. The third radiator 260 and fourth radiator 280 are separated from each other in a second diagonal direction, orthogonal to the diagonal direction of the first subset of radiators 220, 240. In the Figures, the third radiator 260 and fourth radiator 280 are at diagonally opposite vertices 206, 208 of the second shape 210.

The antenna apparatus 1 may be configured to feed the second subset of radiators 260, 280 a common signal. In a polarization diversity mode, the common signal fed to the second subset may be the same as the common signal fed to the first subset. In a separate-channel mode, the first subset and second subset may be fed different signals.

In FIG. 1, but not necessarily all examples, the third vertex 206 of the second shape 210 is within the area 111 defined by the first shape 110, as a result of the partial overlap of the antenna arrays 100, 200. In this example, but not necessarily all examples (FIGS. 6A, 6B), a radiator is present at the third vertex 206, in this case the third radiator 260. The third radiator 260 is therefore an example of a radiator of one shape 210 being within an area 111 defined by the other shape 110.

In the above example, the first, second and fourth vertices 202, 204, 208 of the second shape 210 are outside the area 111 defined by the first shape 110.

In at least some examples the second antenna array 200 is configured to operate in a second frequency band, different from the first frequency band of the first antenna array 100.

The second frequency band could be a sub-band of the first frequency band, or a partially overlapping band, or a non-overlapping band. The specific frequency band depends on implementation. In some, but not necessarily all examples, the second frequency band may be within or cover a low band (e.g. second frequency band <1 GHz, for example, 0.7 to 0.8 GHz).

In some, but not necessarily all examples, the first subset 220, 240 and second subset 260, 280 of radiators of the second antenna array 200 are configured to operate at the same sub-bands within the second frequency band.

It would be appreciated that one or both of the shapes 110, 210 could differ from those shown in FIG. 1.

The antenna apparatus 1 of FIG. 2 will now be described. The antenna apparatus 1 incorporates the antenna arrays 100, 200 of FIG. 1 in a repeating pattern, as a first set of arrays n, and as an adjacent second set of arrays n+1. The sets of arrays can be fed in various ways as described later in relation to FIGS. 5A-6B. More sets of arrays could be provided in some implementations.

The first antenna array 300 of the second set of arrays n+1 is referred to herein as a ‘further first antenna array’ 300 to identify which set of arrays is referred to, and the second antenna array 400 of the second set of arrays is referred to as a ‘further second antenna array’ 400.

In the Figures, the second set of arrays has been labelled with a different set of reference numerals to identify which set of arrays is referred to. The following labels are provided, alongside which are provided numbers in brackets identifying the corresponding features from the first set of arrays:

The further first antenna array 300 comprises: first vertex 302 (102); second vertex 304 (104); third vertex 306 (106); fourth vertex 308 (108); first radiator 320 (120); second radiator 340 (140); third radiator 360 (160); fourth radiator 380 (180); first subset 320, 340 (120, 140); second subset 360, 380 (160, 180); first edge 312 (112); second edge 314 (114); third edge 316 (116); fourth edge 318 (118); first shape 310 (110); first area 311 (111).

The further second antenna array 400 comprises: first vertex 402 (202); second vertex 404 (204); third vertex 406 (206); fourth vertex 408 (208); first radiator 420 (220); second radiator 440 (240); third radiator 460 (260); fourth radiator 480 (280); first subset 420, 440 (220, 240); second subset 460, 480 (260, 280); first edge 412 (212); second edge 414 (214); third edge 416 (216); fourth edge 418 (218); second shape 410 (210); second area 411 (211).

In some examples the shapes 310, 410 of the second set of arrays n+1 could differ in one or more ways from the shapes 110, 210 of the first set of arrays n.

In some, but not necessarily all examples, the second set of arrays n+1 may partially overlap the first set of arrays n. For example, a corner (e.g. 202) of one shape (e.g. 210) of the first set of arrays n may be intertwined with a corner (e.g. 304) of one shape (e.g. 310) of the second set of arrays n+1.

In at least some examples, the partial overlap of the sets of arrays is as follows: a vertex from the first set of arrays n, in this example the vertex 202 (optionally having radiator 220 of set n), overlaps the area 311 defined by the shape 310 of the further first antenna array 300 in set n+1. A vertex from the second set of arrays n+1, in this example the vertex 304 (optionally having radiator 340 of set n+1), overlaps the area 211 defined by the shape 210 of the second antenna array 200 in set n. An advantage is a reduction of length of the antenna apparatus in the second direction 4.

In some, but not necessarily all examples, the antenna apparatus 1 further comprises a third antenna array 500, comprising third radiators 501 that are interleaved with the first antenna array 100, second antenna array 200, further first antenna array 300 and further second antenna array 400 for spatial efficiency. The illustrated third antenna array 500 comprises dipoles. In other examples a different antenna topology such as patches could be used instead.

The third antenna array may be arranged in a plurality of rows 502, 504, 506. The third antenna array may be arranged in columns 510, 520, 530, 540, 550, 560 as illustrated in FIG. 2. The rows may be separated in the first direction 5. The columns may be separated in the second direction 4. Alternatively, the rows and/or columns may be staggered.

The third antenna array 500 comprises radiators 501 that are configured to operate in a third frequency band different from the first frequency band of the first antenna array 100, 300 and different from the second frequency band of the second antenna array 200, 400.

In at least some examples, the third frequency band may be relatively higher than the first frequency band and relatively higher than the second frequency band. In some examples, the third frequency band does not overlap the first frequency band and does not overlap the second frequency band. In an example implementation, the third frequency band may be within or cover a high band (e.g. third frequency band from 1.4 to 2.7 GHz).

In some, but not necessarily all examples, different rows of the third antenna array 500 may be configured to operate in different sub-bands of the third frequency band. The rows may be different sub-arrays of the third antenna array 500.

For a given set of arrays n and/or n+1, the interleaving pattern may be such that:

- at least one of the third radiators 501 is within the area 111/311 of the first shape 110/310; and/or
- at least one of the third radiators 501 is within the area 211/411 of the second shape 210/410; and/or
- at least one of the third radiators 501 is within both areas (a region where the first shape 110/310 and the second shape 210/410 overlap).

In at least some examples, an individual area 111, 211, 311, 411 contains a plurality of the third radiators 501, for example at least four of the third radiators 501.

In the illustrated example an individual area 111, 211, 311, 411 contains third radiators 501 from a plurality of rows of the third radiators 501, and/or from a plurality of columns of the third radiators 501, but not all rows and not all columns.

The Figures show the third radiators 501 arranged in three rows. In another example, the third radiators 501 are arranged in two rows. In yet another example, the third radiators 501 are arranged in more than three rows.

The illustrations show three columns 510, 520, 530 of third radiators 501 interleaved with the first set of arrays n, and a different three columns 540, 550, 560 of third radiators 501 interleaved with the second set of arrays n+1. The number of columns could vary from that shown.

A specific example arrangement of third radiators 501 corresponding to the illustrations is given below, using matrix notation to denote how the third radiators 501 could interleave with the first antenna array 100 and the second antenna array 200 in set n (the same can apply to set n+1). Matrix (1) shows the third radiators 501 as being arranged in at least three rows and at least three columns:

$$\begin{bmatrix} 501 & 501 & 501 \\ 501 & 501 & 501 \\ 501 & 501 & 501 \end{bmatrix} \tag{1}$$

Matrix (2) shows which of the rows and columns of third radiators 501 are within (1) the area 111 of the first shape 110 and which are outside (0) the area 111 of the first shape 110:

$$\begin{bmatrix} 0 & 1 & 1 \\ 0 & 1 & 1 \\ 0 & 0 & 0 \end{bmatrix} \tag{2}$$

Matrix (3) shows which of the rows and columns of third radiators 501 are within the area 211 of the second shape 210 (1) and which are outside (0) the area 211 of the second shape 210:

$$\begin{bmatrix} 0 & 0 & 0 \\ 1 & 1 & 0 \\ 1 & 1 & 0 \end{bmatrix} \tag{3}$$

This arrangement enables a high density of radiators but is optional and could be varied.

Figure 2:
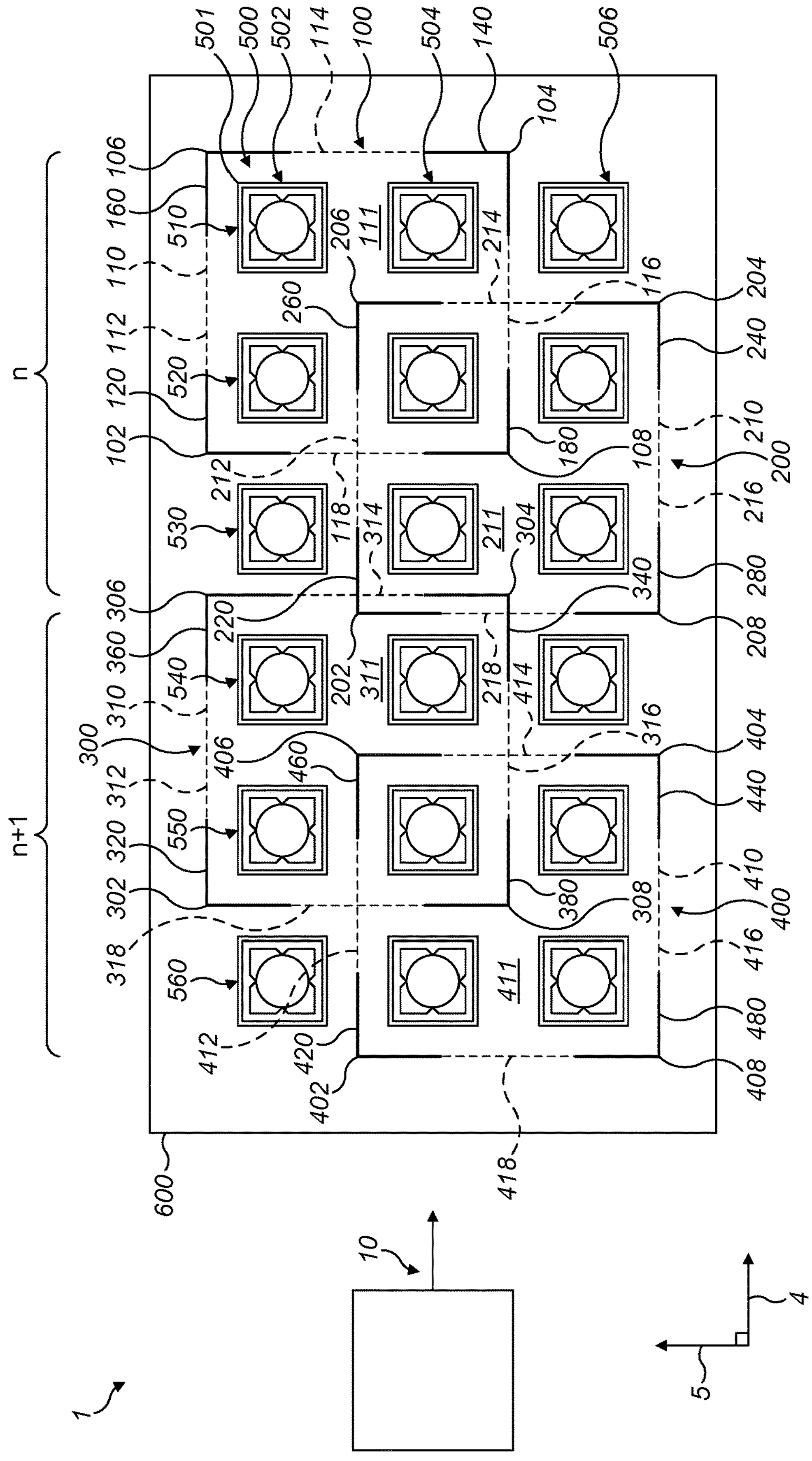
FIG. 2 shows an example embodiment of the subject matter described herein.

The antenna apparatus 1 in FIG. 2 comprises a ground plane 600. The ground plane 600 may be shared by the first antenna array 100, 300, the second antenna array 200, 400, and the third antenna array 500.

The antenna apparatus 1 in FIG. 2 comprises a feed 10 configured to feed signals to the respective antenna arrays 100, 200, 300, 400, 500.

Figure 3:
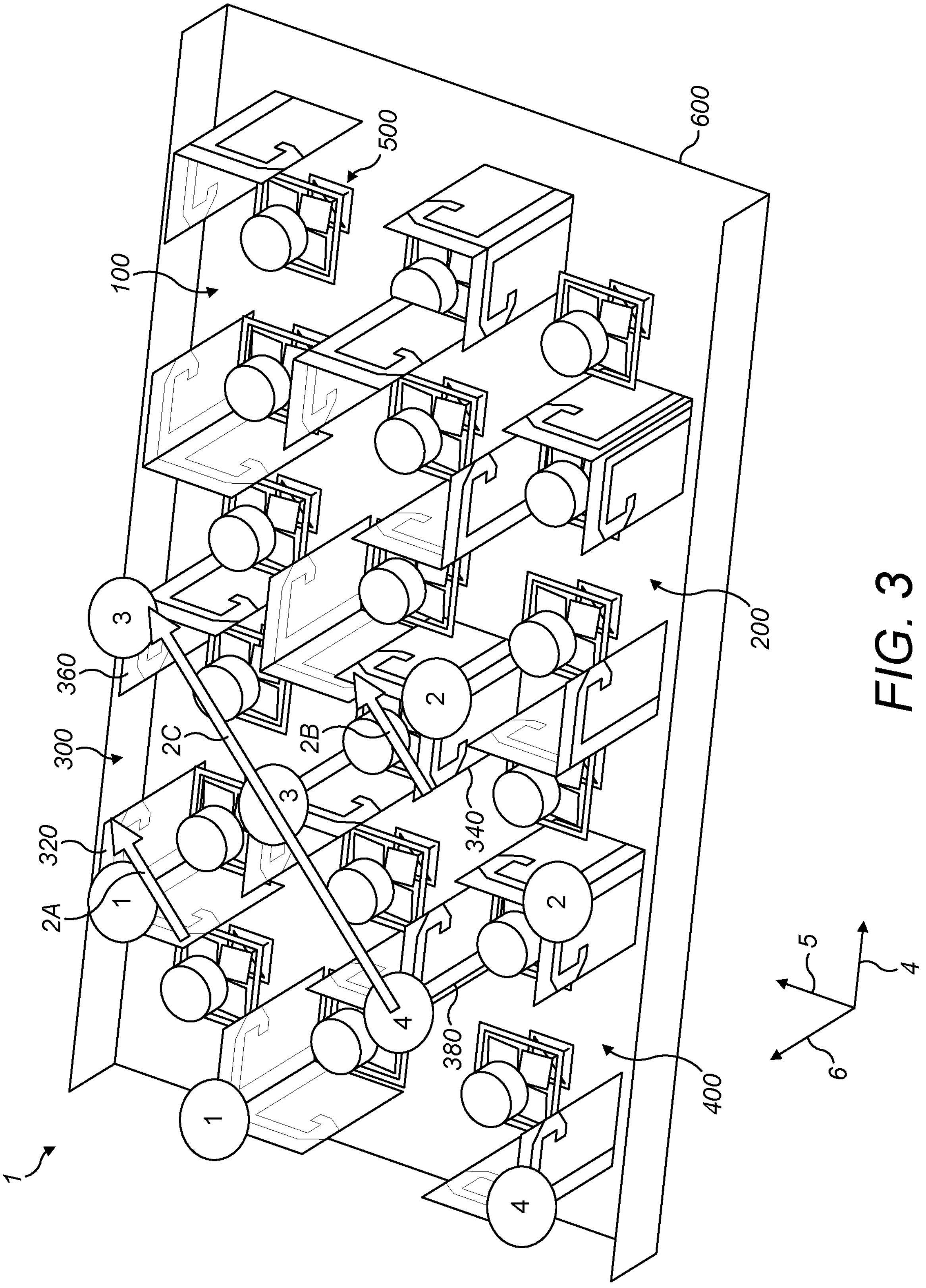
FIG. 3 shows an example embodiment of the subject matter described herein.

FIG. 3 illustrates a perspective view of the antenna apparatus 1 of FIG. 2, revealing a third, height direction 6, orthogonal to the directions 4, 5.

FIG. 3 shows that the radiators of one or more of the antenna arrays 100, 200, 300, 400 can be elevated above the ground plane 600 in the third direction 6. Radiators may individually comprise elevated arms that extend parallel to the ground plane 600, and that point towards adjacent vertices/radiators. In at least some examples the first antenna array 100, 300 and the second antenna array 200, 400 are elevated above the third antenna array 500.

Figure 4A:
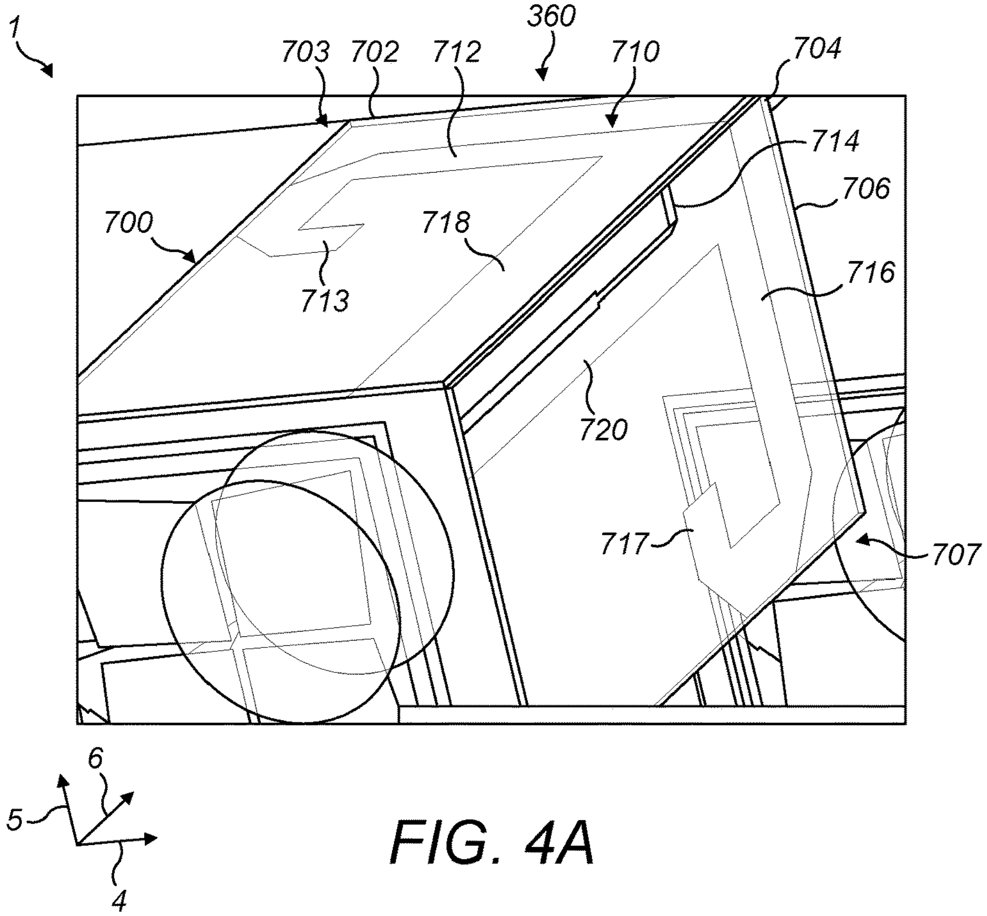
FIGS. 4A, 4B show example embodiments of the subject matter described herein.
Figure 4B:
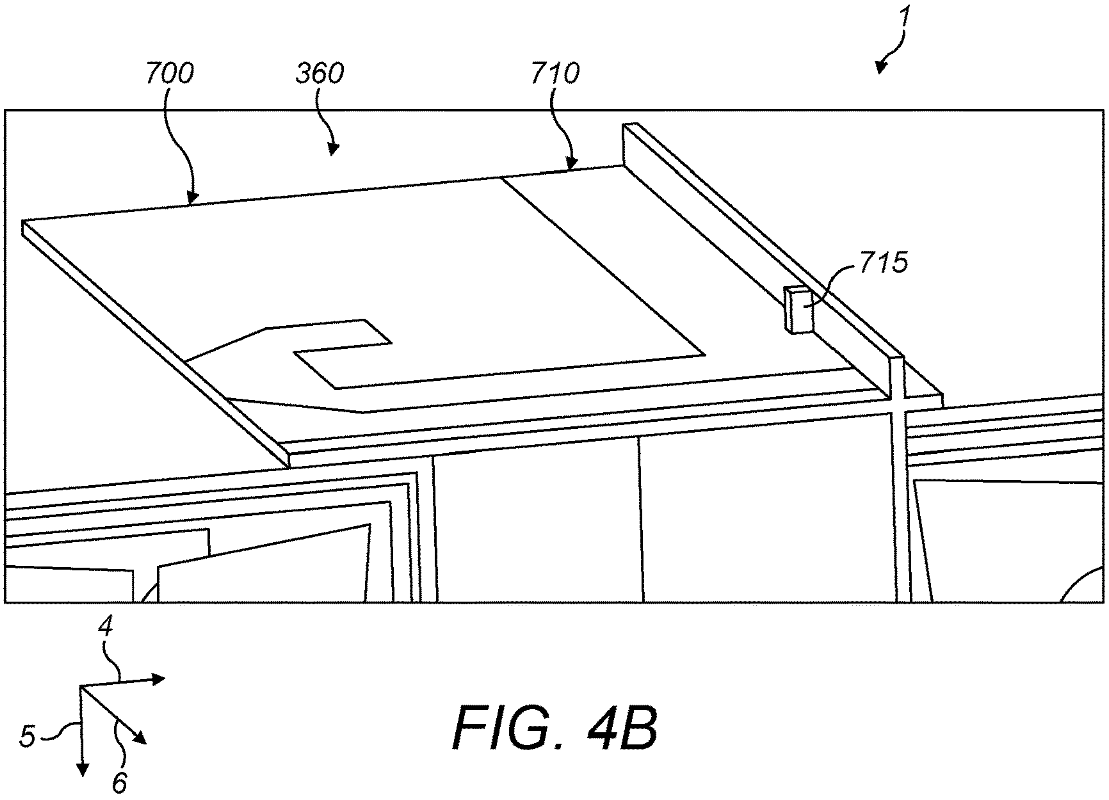

As shown in close-up detail by FIGS. 4A, 4B, the radiators of the first antenna array 100, 300 and the radiators of the second antenna array 200, 400 can be elevated above the ground plane 600 by upstanding substrates 700.

FIGS. 4A, 4B use the example of the third radiator 360 of the further first antenna array 300 of set n+1, to demonstrate a radiator design that can apply to the radiators of the antenna arrays 100, 200, 300, 400.

The upstanding substrate 700 may be formed from one or more sheets of electrically insulating material, extending upwardly in the third direction 6 from the ground plane 600. The radiator 360 may comprise a shaped strip 710 of electrically conductive material. The radiator 360 may be planar with respect to the upstanding substrate 700.

The upstanding substrate 700 has a fold 704 (folded shape) in plan view to enable the radiator 360 to form the shape as defined earlier (e.g. L-shape). The term 'fold' does not imply that a material has been through a folding step—the appearance of a fold could be created by joining two pieces of material at an angle.

The angle of the illustrated fold 704 is approximately 90 degrees to enable polarization directions of +45 degrees and −45 degrees. Diagonal polarization makes efficient use of a small apparatus as radiators of a same subset can be spaced further apart. The precise fold angle could vary. In some examples the fold angle could be greater than 45 degrees and less than 135 degrees. In some examples the fold angle could be 360/number of vertices of the shape. Different radiators of a same antenna array (or at least of a same subset) could have the same fold angle as one another.

In this example, the upstanding substrate 700 comprises a flange 702, to a first side of the fold 704, extending at least partway along an edge (e.g. 312) of the respective shape (e.g. 310). The upstanding substrate 700 comprises a web 706, to a second side of the fold 704, extending at least partway along another edge (e.g. 314) of the shape 310. The angle between the flange 702 and the web 706 may be the same as the fold angle described above.

In this example, but not necessarily all examples, the upstanding substrates 700 do not form a continuous perimeter of the shape (e.g. 310). The upstanding substrates 700 discontinuously extend around the perimeter of the shape 310. Looking at an individual substrate 700, the flange 702 terminates, leaving a gap 703 to the upstanding substrate of an adjacent vertex. The web 706 terminates, leaving a gap 707 to the upstanding substrate of the other adjacent vertex. The gaps 703, 707 may leave the edge centres of the shape 310 vacant.

In this example, but not necessarily all examples, the flange 702 of the upstanding substrate 700 extends in one of the first direction 5 or the second direction 4, and the web 706 extends in the other of the first direction 5 or the second direction 4.

The flange 702 of the upstanding substrate 700 comprises a first elevated arm 712 of a radiator (e.g. 360 as shown). The web 706 of the upstanding substrate 700 comprises a second elevated arm 716 of the radiator 360. The first and second elevated arms 712, 716 extend parallel to the ground plane 600 at an elevated position above the ground plane 600.

Where at least two elevated arms are provided, the first elevated arm 712 may not galvanically couple with the second elevated arm 716 except via their common ground connection. However, the first elevated arm 712 may be configured to capacitively couple with the second elevated arm 716 to enable the radiator 360 to operate in the required polarization as well as the required frequency band.

In at least some examples the first elevated arm 712 of the radiator 360 may have an electrical length that is longer than a physical length of the flange 702. For example, the first elevated arm 712 may be folded so as to vary in height above the ground plane 600. In FIGS. 4A, 4B. the first elevated arm 712 comprises a direction-changing fold 713. The direction-changing fold 713 may be distal from the fold 704 of the upstanding substrate 700. The direction-changing fold 713 may be a downwards fold towards the ground plane 600. The illustrated direction-changing fold 713 is a direction-reversing fold (e.g. U-shaped fold). Alternatively, the direction-changing fold could be an L-shaped fold or the like.

In at least some examples the second elevated arm 716 of the radiator 360 may have an electrical length that is longer than a physical length of the web 706. For example, the second elevated arm 716 may be folded so as to vary in height above the ground plane 600. In FIGS. 4A, 4B. the second elevated arm 716 comprises a direction-reversing (e.g. U-shaped) fold 717. The direction-reversing fold 717 may be distal from the fold 704 of the upstanding substrate 700. The direction-reversing fold 717 may be a downwards fold towards the ground plane 600.

In at least some examples the radiator 360 comprises at least one upstanding leg 718, 720 in addition to elevated arms. The at least one upstanding leg 718, 720 may be configured to electrically couple (e.g. galvanically couple) the elevated arms to the ground plane 600.

In this example the radiator 360 comprises a first upstanding leg 718. The first upstanding leg 718 is configured to electrically couple to the first elevated arm 712 of the radiator 360. For example, the material defining the first upstanding leg 718 may be folded at a corner to define the first elevated arm 712. The first upstanding leg 718 may be proximal to the fold 704 of the upstanding substrate 700 wherein the first elevated arm 712 extends away from the fold 704 of the upstanding substrate 700. The first upstanding leg 718 may be provided on the flange 702 of the upstanding substrate 700.

In this example, but not necessarily all examples, the radiator 360 comprises a second, separate upstanding leg 720 for the other elevated arm 716. The second upstanding leg 720 is configured to electrically couple to the second elevated arm 716 of the radiator 360. For example, the material defining the second upstanding leg 720 may be folded at a corner to define the second elevated arm 716. The second upstanding leg 720 may be proximal to the fold 704 of the upstanding substrate 700 wherein the second elevated arm 716 extends away from the fold 704 of the upstanding substrate 700. The second upstanding leg 720 may be provided on the web 706 of the upstanding substrate 700.

Where at least two upstanding legs are provided, the first upstanding leg 718 may not galvanically couple with the second elevated arm 716 and the second upstanding leg 720 may not galvanically couple with the first elevated arm 712, notwithstanding their connections to a shared ground plane 600.

In at least some examples an upstanding feed line 714 is provided, as shown in FIG. 4A. The upstanding feed line 714 is configured to electrically couple with the radiator 360. In the example, the upstanding feed line 714 is configured to electrically couple with the radiator 360 at the corner between the first upstanding leg 718 and the first elevated arm 712. In the example, the upstanding feed line 714 is to the interior face of the upstanding substrate 700 (i.e. within the area 311), extending upwardly proximal to the second upstanding leg 720, and then extends through the flange 702 of the upstanding substrate 700 to the exterior side of the substrate 700, where a feed connection point 715 is visible in FIG. 4B. If the radiator 360 is instead printed to the interior side of the substrate 700 or sandwiched between substrate layers, the feed line 714 need not extend all the way through the flange 702 as shown. The vertical height of the feed connection point 715 above the ground plane 600 introduces an inductance between the feed connection point 715 and a ground point where the upstanding feed line 714 meets the ground plane 600.

The illustrated upstanding feed line 714 is a microstrip printed on the web 706. In some examples, the upstanding feed line 714 could be printed on another part of the substrate 700. In other examples, the microstrip could be replaced by another electrical transmission line such as a coaxial cable.

A radiator configured as shown in FIGS. 4A, 4B behaves as a dipole that has been folded to define a vertex of a shape of an antenna array. In other examples, the radiator can be configured as a monopole antenna. Examples of monopole antennas include quarter-wave monopoles, intermediate-fed quarter-wave monopoles, inverted-F antennas, and inverted-L antennas.

Referring back to FIG. 3, an individual radiator configured as shown in FIG. 4A, 4B operates at the polarization 2 or 3, which depends on which way the radiator is facing, which in turn depends on which vertex the radiator is located at. An example is provided in FIG. 3 by arrows which are overlaid onto the further first antenna array 300, showing:

- the first radiator 320 defines the first polarization 2 as shown by the short arrow 2A;
- the second radiator 340 diagonally opposite the first radiator 320, defines the first polarization 2 as shown by the short arrow 2B;
- feeding a same signal in phase to both the first radiator 320 and to the second radiator 340 enables operation at the first polarization 2, as shown by the long arrow 2C. The first polarization 2 is inclined +45 degrees in this example.

In at least some examples the polarization associated with a given radiator is orthogonal to the vector sum of the vector of the first elevated arm 712 and the vector of the second elevated arm 716. Therefore, feeding a pair of radiators physically diagonally separated by −45 degrees will operate in a polarization direction of +45 degrees.

Following the above example based on FIG. 3, feeding the third radiator 360 and fourth radiator 380 would enable operation at the second polarization 3.

It would be appreciated that the polarization direction related to a particular radiator is not limited to that shown in the Figures. The relationship could be configured by changing the radiator's geometry and/or by controlling how signals are fed to subsets of radiators. However, it is noted that greater efficiency can be obtained by feeding an in-phase signal to a set of radiators that have been physically arranged to obtain a required polarization direction, for example as shown and described, rather than controlling polarization of a poorly laid-out array using lossy signal processing means (e.g. complex RF splitters that control phase) in a signal path.

Figure 5A:
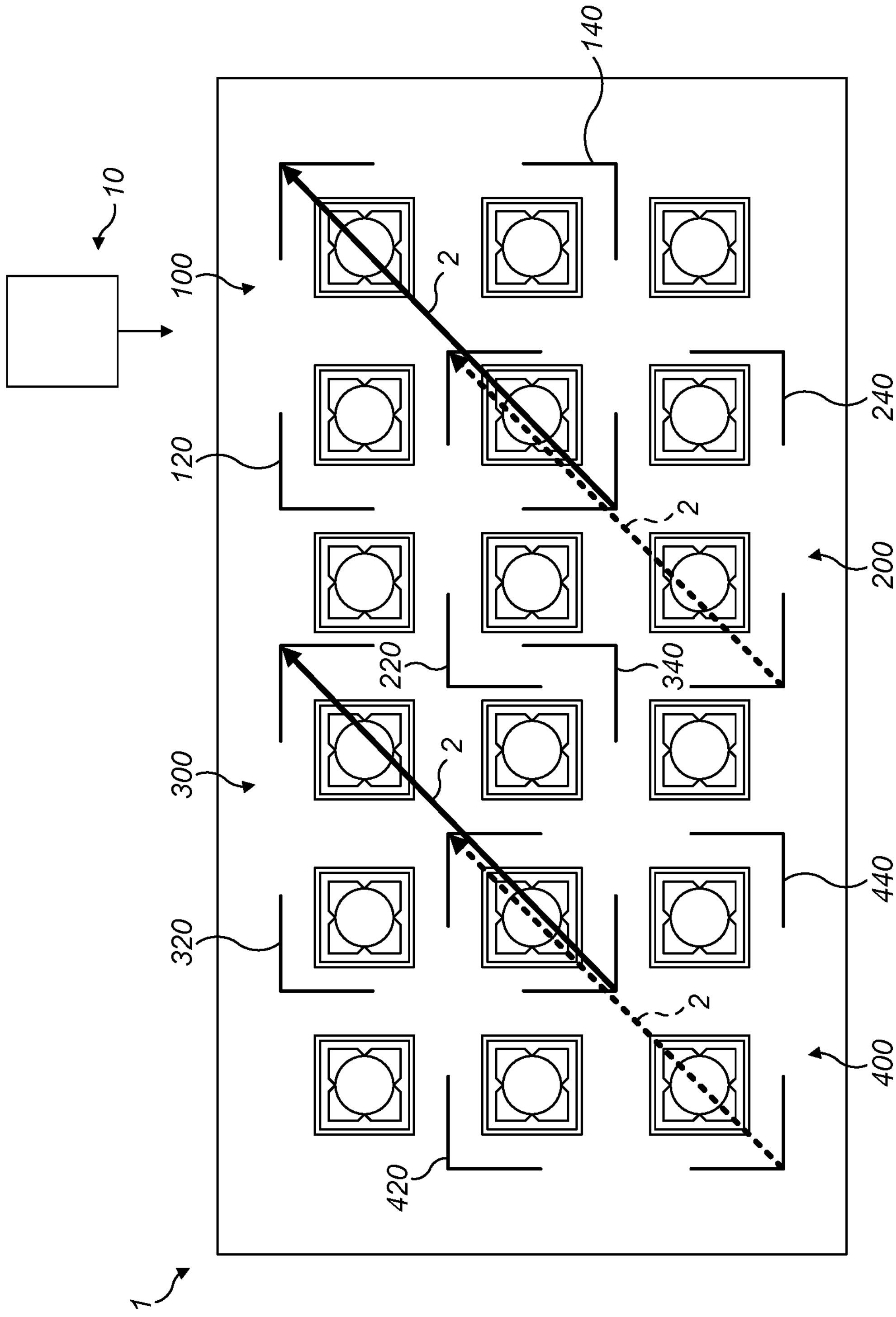
FIGS. 5A, 5B show example embodiments of the subject matter described herein.
Figure 5B:
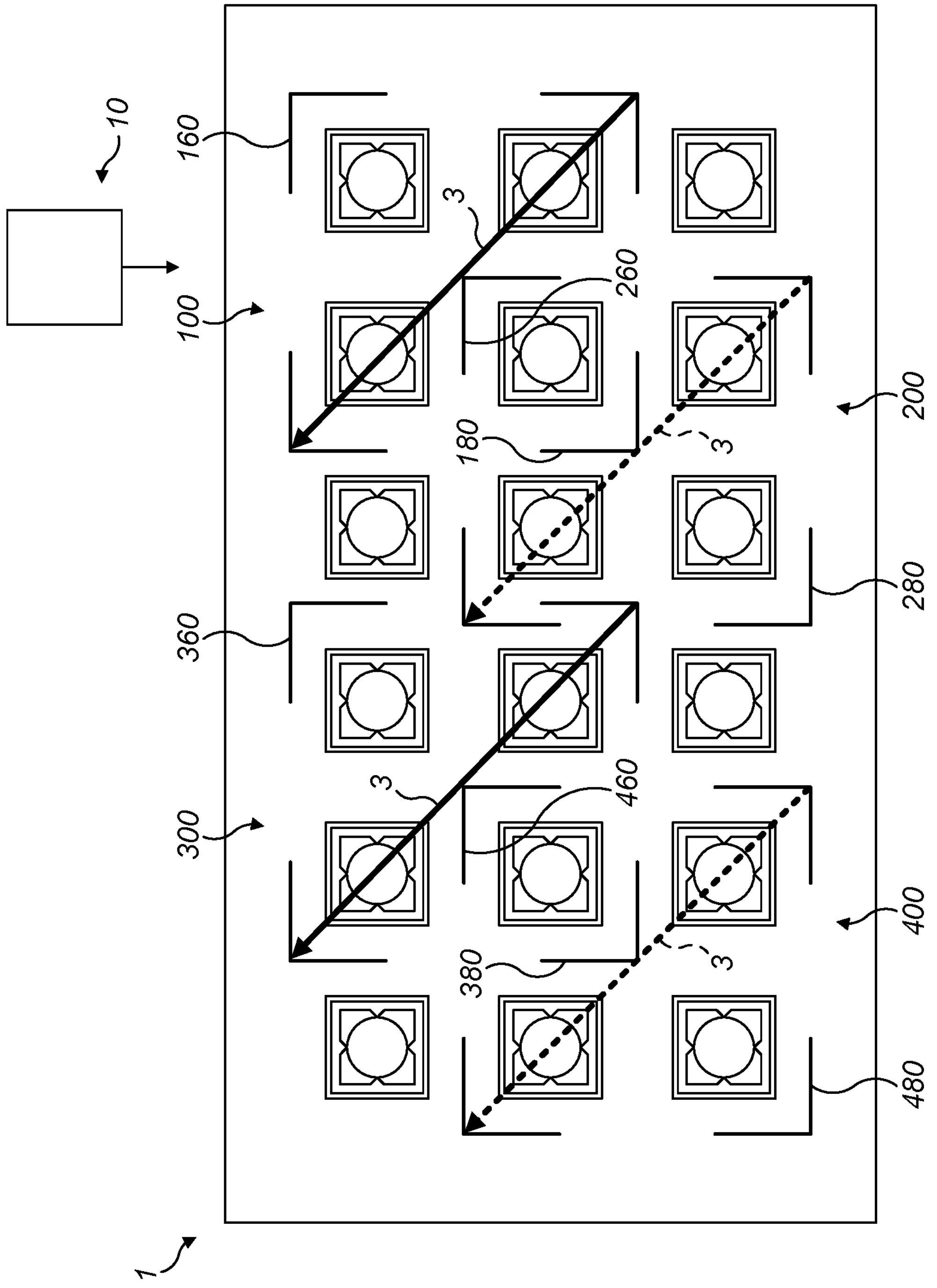

FIGS. 5A-5B relate to a first embodiment in accordance with FIGS. 2 and 3, wherein various radiators (e.g. 180, 220, 260, 340, 380, 460) overlap into the areas of other antenna arrays to which said radiators do not belong. Optionally, and as shown, an antenna array 100, 200, 300, 400 may have a quad-corners arrangement of radiators. Arrows illustrate polarization directions.

In FIG. 5A, in the first set of arrays n:

- the first radiator 120 and second radiator 140 of the first antenna array 100 are fed to operate in the first polarization 2 in the first frequency band (solid arrow); and
- the first radiator 220 and second radiator 240 of the second antenna array 200 are fed to operate in the first polarization 2 in the second frequency band (dashed arrow).

In FIG. 5B, in the first set of arrays n:

- the third radiator 160 and fourth radiator 180 of the first antenna array 100 are fed to operate in the second polarization 3 in the first frequency band (solid arrow); and
- the third radiator 260 and fourth radiator 280 of the second antenna array 200 are fed to operate in the second polarization 3 in the second frequency band (dashed arrow).

In FIG. 5A, in the second set of arrays n+1:

- the first radiator 320 and second radiator 340 of the further first antenna array 300 are fed to operate in the first polarization 2 in a first frequency band (solid arrow); and
- the first radiator 420 and second radiator 440 of the further second antenna array 400 are fed to operate in the first polarization 2 in a second frequency band (dashed arrow).

In FIG. 5B, in the second set of arrays n+1:

- the third radiator 360 and fourth radiator 380 of the further first antenna array 100 are fed to operate in the second polarization 3 in the first frequency band (solid arrow); and
- the third radiator 460 and fourth radiator 480 of the further second antenna array 400 are fed to operate in the second polarization 3 in the second frequency band (dashed arrow).

In an example, the radiators 120, 140, 320, 340 of the different sets n, n+1 may be fed a first common signal. The radiators 220, 240, 420, 440 of the different sets n, n+1 may be fed a second common signal.

Despite the reduced width of the antenna apparatus 1 and the partial overlap of antenna arrays 100, 200, 300, 400, the illustrated antenna apparatus 1 is capable of a beamwidth (e.g. horizontal beamwidth) of as low as 45-65 degrees between −3 dB cutoff points.

In alternative implementations, the sets n, n+1 may be fed different signals and/or may operate at different frequency bands.

Figure 6A:
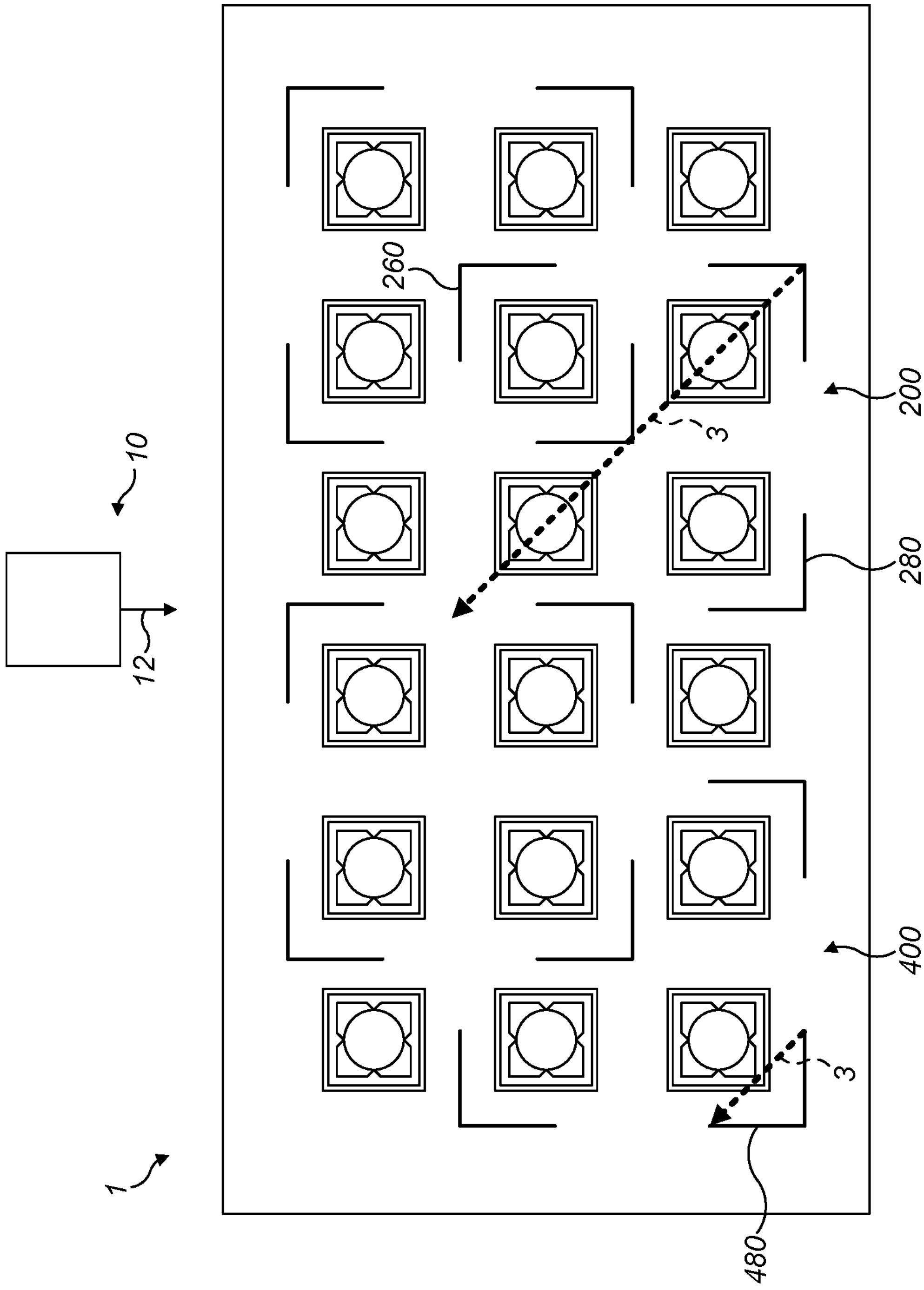
FIGS. 6A, 6B show example embodiments of the subject matter described herein.
Figure 6B:
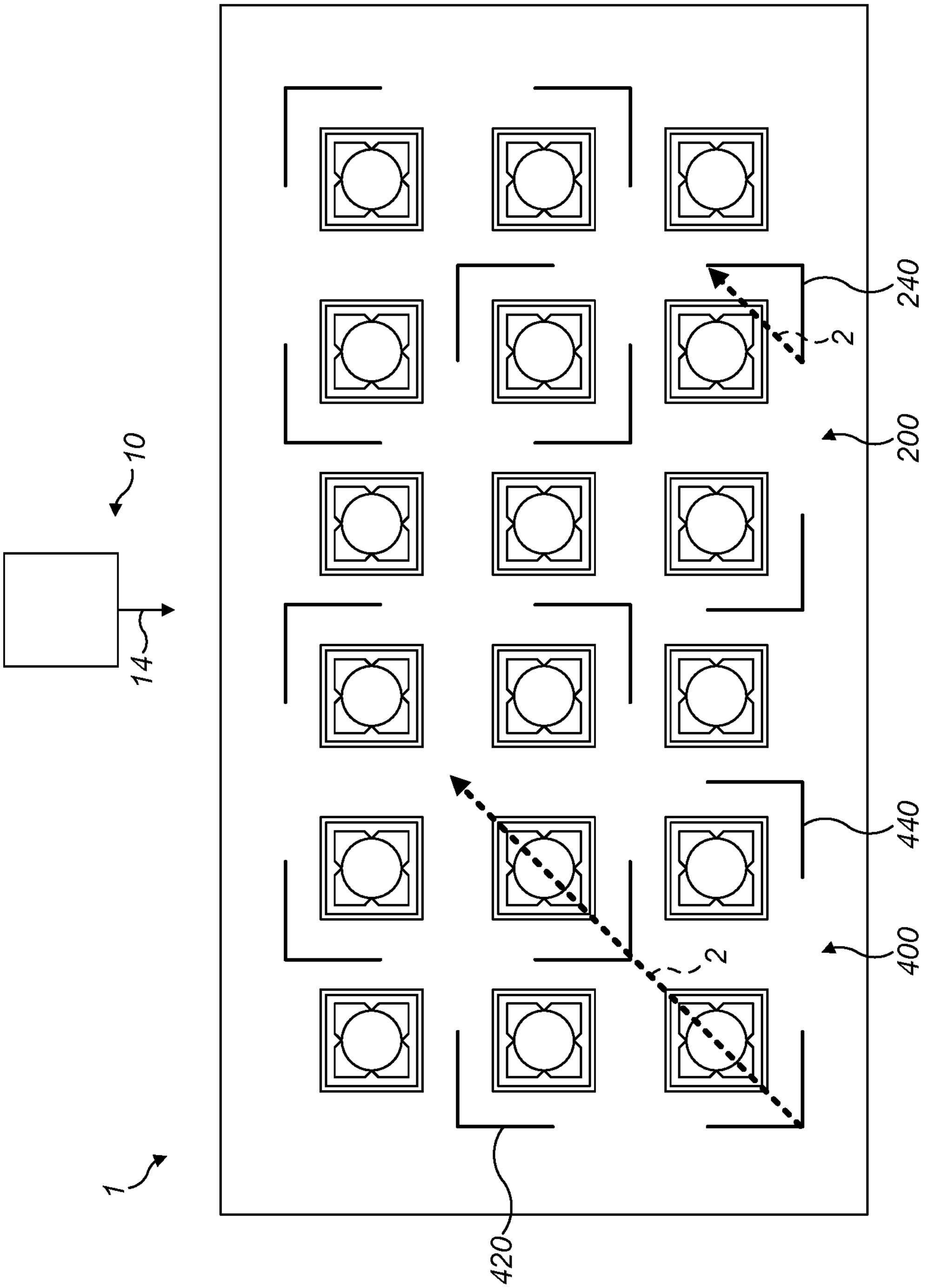

FIGS. 6A-6B relate to a different embodiment than FIGS. 5A-5B wherein one or more radiators (e.g. 220, 460) have been removed from one or more vertices, to further improve isolation between the different arrays. The improved isolation is useful for applications such as ultra-wideband arrays. Optionally, and as shown, at least one of the antenna arrays 200 now has a tri-corner arrangement of radiators rather than a quad-corner arrangement of radiators.

More specifically, the isolation can be improved by removing a radiator that is within the area of another antenna array. This increases the average separation of the second antenna array 200, 400 from the first antenna array 100, 300 without enlarging the apparatus 1.

In the first set of arrays n as illustrated, but not necessarily in all examples, the first radiator 220 of the second antenna array 200 has been removed. Removing this radiator 220 improves the isolation between the second antenna array 200 of set n, and the further first antenna array 300 of set n+1. This removed radiator 220 previously was within the area 311. Therefore, the area 311 is now clear of the radiator 220.

Although the radiator 220 at vertex 202 has been removed, the radiators 260, 280 at adjacent vertices 206, 208 still point towards the now-empty vertex 202. In other words, the shape 210 is the same despite not having radiators at every vertex. The shape 210 still overlaps the adjacent shape 310.

In the second set of arrays n+1 as illustrated, but not necessarily in all examples, the third radiator 460 of the further second antenna array 400 has been removed. Removing this radiator 460 improves the isolation between the further second antenna array 400, and the further first antenna array 300. This removed radiator 460 previously was within the area 311. Therefore, the area 311 is now clear of the radiator 460. The area 311 may be entirely clear of radiators.

Although the radiator 460 at vertex 406 has been removed, the radiators 420, 440 at adjacent vertices 402, 404 still point towards the now-empty vertex 406. In other words, the shape 410 is the same despite not having radiators at every vertex. The shape 410 still overlaps the adjacent shape 310.

In the second set of arrays n+1, the removal of the third radiator 460 of the further second antenna array 400 means that the second subset of radiators of the further second antenna array 400 now has fewer radiators than the first subset (420, 440)—just one radiator 480 in the illustrated example. Therefore, a proposal for efficient operation at the second polarization 3 is shown in FIG. 6A, comprising feeding a common signal 12 to both sets of arrays n, n+1, for example to:

set n+1: the second subset 480 of the radiators of the further second antenna array 400; and set n: the second subset 260, 280 of the radiators of the further second antenna array 400.

An advantage is that the radiators 260, 280, 480 are spread far apart from each other and provide high gain despite the compact dimensions of the antenna apparatus 1, and despite the removal of some radiators for improved isolation.

In the first set of arrays n, the removal of the first radiator 220 of the second antenna array 200 means that the first subset of radiators of the second antenna array 200 now has fewer radiators than the second subset (260, 280)—just one radiator 240 in the illustrated example. Therefore, a proposal for efficient operation at the first polarization 2 is shown in FIG. 6B, comprising feeding a common signal 14 to:

set n: the first subset 240 of the radiators of the second antenna array 200; and set n+1: the first subset 420, 440 of the radiators of the second antenna array 200.

Note that because a different corner has been removed from each set n and n+1, both polarizations 2, 3 still have the same number (three) of radiators available for operation at each polarization.

In an alternative example, the radiators 180, 340 are removed for the same results but applied to the other antenna array 100, 300.

In other examples, different corners could be removed in addition to, or instead of the above-mentioned corners. For example, the radiators 260 and/or 420 could be removed, if a lesser efficiency benefit can be tolerated. A single corner (e.g. 260) could be removed, if a lesser efficiency benefit and/or squint of a radiation pattern can be tolerated.

Figure 7:
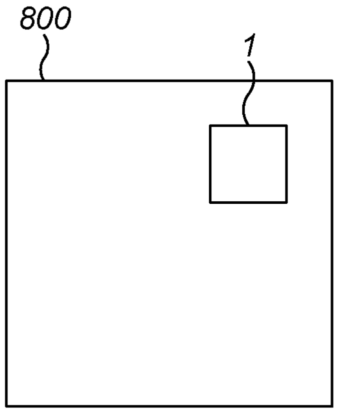
FIG. 7 shows an example embodiment of the subject matter described herein.

FIG. 7 illustrates a cellular base station 800 comprising the antenna apparatus 1 as previously described. The term cellular base station 800 refers to components used for performing some or all of the base station radio access functions. The antenna apparatus 1 can for example be a distributed unit in a split base station architecture. Alternatively, the cellular base station 800 and the antenna apparatus 1 can be integrated together as a unitary unit, or as a physical connection of two units to form a unitary unit. The antenna apparatus 1 can, in some examples, be mounted on a tower or support structure and be separate to other components of the base station 800.

The radio frequency circuitry and the antenna apparatus 1 may be configured to operate in a plurality of operational resonant frequency bands. For example, the operational frequency bands may include (but are not limited to) Long Term Evolution (LTE) (US) (734 to 746 MHz and 869 to 894 MHz), Long Term Evolution (LTE) (rest of the world) (791 to 821 MHz and 925 to 960 MHz); US—Global system for mobile communications (US-GSM) 850 (824-894 MHz) and 1900 (1850-1990 MHz); European global system for mobile communications (EGSM) 900 (880-960 MHz) and 1800 (1710-1880 MHz); European wideband code division multiple access (EU-WCDMA) 900 (880-960 MHz); personal communications network (PCN/DCS) 1800 (1710-1880 MHz); US wideband code division multiple access (US-WCDMA) 1700 (transmit: 1710 to 1755 MHz, receive: 2110 to 2155 MHz) and 1900 (1850-1990 MHz); wideband code division multiple access (WCDMA) 2100 (transmit: 1920-1980 MHz, receive: 2110-2180 MHz); personal communications service (PCS) 1900 (1850-1990 MHz); time division synchronous code division multiple access (TD-SCDMA) (1900 MHz to 1920 MHz, 2010 MHz to 2025 MHz), frequency allocations for 5G may include e.g. 700 MHz, 410 MHz-7125 MHz (FR1), 24250 MHz-52600 MHz (FR2), 3.6-3.8 GHz, 24.25-27.5 GHz, 31.8-33.4 GHz, 37.45-43.5, 66-71 GHz, mmWave, and >24 GHz).

The radio frequency circuitry and the antenna apparatus 1 may be configured to operate in a plurality of operational resonant frequency bands. For example, the operational frequency bands may include (but are not limited to)

| | FDD | | TDD |
|---|---|---|---|
| A | 555-806 | A | 2010-2025 |
| B | 694-960 | B | 1930-1990 |
| C | 806-894 | C | 1910-1930 |
| D | 694-862 | D | 2570-2620 |
| E | 790-960 | E | 2300-2400 |
| F | 694-894 | F | 1880-1920 |
| G | 870-960 | G | 2545-2650 |
| H | 694-906 | H | 2500-2690 |
| I | 824-960 | L | 1880-2025 |
| J | 1400-2200 | M | 1880-2690 |
| K | 824-894 | Y | 3300-3800 |
| L | 1695-2690 | U | 3400-3600 |
| M | 2300-2690 | Z | 3400-4200 |
| N | 790-862 | | |
| P | 1850-1995 | | |
| Q | 1710-1880 | | |
| R | 1695-2200 | | |
| S | 806-870 | | |
| U | 1920-2170 | | |
| W | 1695-2400 | | |
| Y | 1400-1520 | | |
| Z | 23002400 | | |

The radio frequency circuitry and the antenna apparatus 1 may be configured to operate in a plurality of operational resonant frequency bands. For example, the operational frequency bands may include (but are not limited to) the bands specified in the current release of 3GPP TS 36.101.

A frequency band over which an antenna apparatus 1 can efficiently operate is a frequency range where the antenna's return loss is less than an operational threshold. For example, efficient operation may occur when the antenna's return loss is better than (that is, less than) −10 dB or better.

An operational resonant mode (operational bandwidth) of a radiating element may be defined as where the return loss S11 of the radiating element is better than an operational threshold T such as, for example, −10 or −14 dB.

Where a structural feature has been described, it may be replaced by means for performing one or more of the functions of the structural feature whether that function or those functions are explicitly or implicitly described.

The above described examples find application as enabling components of:

automotive systems; telecommunication systems; electronic systems including consumer electronic products; distributed computing systems; media systems for generating or rendering media content including audio, visual and audio visual content and mixed, mediated, virtual and/or augmented reality; personal systems including personal health systems or personal fitness systems; navigation systems; user interfaces also known as human machine interfaces; networks including cellular, non-cellular, and optical networks; ad-hoc networks; the internet; the internet of things; virtualized networks; and related software and services.

The term ‘comprise’ is used in this document with an inclusive not an exclusive meaning. That is any reference to X comprising Y indicates that X may comprise only one Y or may comprise more than one Y. If it is intended to use ‘comprise’ with an exclusive meaning then it will be made clear in the context by referring to “comprising only one.” or by using “consisting”.

In this description, reference has been made to various examples. The description of features or functions in relation to an example indicates that those features or functions are present in that example. The use of the term ‘example’ or ‘for example’ or ‘can’ or ‘may’ in the text denotes, whether explicitly stated or not, that such features or functions are present in at least the described example, whether described as an example or not, and that they can be, but are not necessarily, present in some of or all other examples. Thus ‘example’, ‘for example’, ‘can’ or ‘may’ refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although examples have been described in the preceding paragraphs with reference to various examples, it should be appreciated that modifications to the examples given can be made without departing from the scope of the claims.

Features described in the preceding description may be used in combinations other than the combinations explicitly described above.

Although functions have been described with reference to certain features, those functions may be performable by other features whether described or not.

Although features have been described with reference to certain examples, those features may also be present in other examples whether described or not.

The term ‘a’ or ‘the’ is used in this document with an inclusive not an exclusive meaning. That is any reference to X comprising a/the Y indicates that X may comprise only one Y or may comprise more than one Y unless the context clearly indicates the contrary. If it is intended to use ‘a’ or ‘the’ with an exclusive meaning then it will be made clear in the context. In some circumstances the use of ‘at least one’ or ‘one or more’ may be used to emphasis an inclusive meaning but the absence of these terms should not be taken to infer any exclusive meaning.

The presence of a feature (or combination of features) in a claim is a reference to that feature or (combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described. Whilst endeavoring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

We claim:

1. An apparatus, comprising:

a first antenna array comprising first radiators arranged at a plurality of vertices defining a first shape; and a second antenna array comprising second radiators arranged at a plurality of vertices defining a second shape, wherein a first subset and a second subset of the first radiators are configured to operate at different polarizations, wherein a first subset and a second subset of the second radiators are configured to operate at different polarizations, and wherein the first shape and the second shape partially overlap, wherein a radiator of the first radiators is within an area defined by the second shape, and one or more other radiators of the first radiators are outside the area defined by the second shape and the radiator of the first radiators within the area defined by the second shape is equidistant from the second radiators spread out to define the second shape to enable a narrow horizontal beamwidth and a high gain to be maintained; and wherein the different polarizations of the first subset and the second subset of the first radiators and the different polarizations of the first subset and the second subset of the second radiators are diagonally arranged relative to an elongate axis through the first antenna array and the second antenna array.

2. The apparatus of claim 1, wherein the first antenna array and the second antenna array extend in a first direction and in a second direction, wherein the partial overlap is partial overlap in the first direction and partial overlap in the second direction.

3. The apparatus of claim 1, wherein a radiator of the second radiators is within an area defined by the first shape, and one or more other radiators of the second radiators are outside the area defined by the first shape.

4. The apparatus of claim 1, wherein the first antenna array is configured to operate in a first frequency band, and wherein the second antenna array is configured to operate in a second frequency band.

5. The apparatus of claim 1, wherein the first subset of first radiators are diagonally separated from one another in a first diagonal direction and configured to operate at a first polarization, and wherein the second subset of first radiators are diagonally separated from one another in a second diagonal direction and configured to operate at a second polarization, wherein the first subset of second radiators are diagonally separated from one another in a first direction and configured to operate at a first polarization, and wherein the second subset of second radiators comprises at least one radiator configured to operate at a second polarization.

6. The apparatus of claim 1, wherein for one or more vertices of at least one of the first shape or the second shape, a radiator at said vertex extends at least partway towards an adjacent vertex along an edge, and extends at least partway towards another adjacent vertex along another edge.

7. The apparatus of claim 1, wherein the first radiators are arranged at four or more vertices of the first shape, and wherein the second radiators are arranged at three or more vertices of the second shape.

8. The apparatus of claim 1, comprising fewer second radiators than first radiators.

9. The apparatus of claim 8, wherein a vertex of the second shape is free from radiators.

10. The apparatus of claim 1, comprising a ground plane, wherein at least one of the first radiators or the second radiators are elevated above the ground plane.

11. The apparatus of claim 10, wherein at least one of the first radiators or second radiators are elevated above the ground plane by upstanding substrates that are folded to define vertices.

12. The apparatus of claim 11, wherein the upstanding substrates discontinuously extend around a perimeter of at least one of the first shape or discontinuously extend around a perimeter of the second shape.

13. The apparatus of claim 11, wherein the substrates are L-shaped.

14. The apparatus of claim 1, comprising a third antenna array comprising third radiators that are configured to operate in a third frequency band different from a frequency band of the first antenna array and different from a frequency band of the second antenna array, wherein the third antenna array is interleaved with the first antenna array and the second antenna array.

15. The apparatus of claim 14, wherein the third antenna array is configured to operate in a relatively high frequency band, and wherein the first antenna array and the second antenna array are configured to operate in relatively low frequency bands.

16. The apparatus of claim 14, wherein at least one of the third radiators is within an area defined by at least one of the first shape, or wherein at least one of the third radiators is within the area defined by the second shape, or wherein at least one of the third radiators is within a region where the first shape and the second shape overlap.

17. The apparatus of claim 14, wherein the third antenna array is arranged in a plurality of rows and in a plurality of columns.

18. The apparatus of claim 1, wherein the first antenna array and the second antenna array are a first set of arrays, and wherein the antenna apparatus comprises a second set of arrays adjacent the first set of arrays, the second set of arrays comprising:

a further first antenna array comprising first radiators arranged at a plurality of vertices defining a first shape; and a further second antenna array comprising second radiators arranged at a plurality of vertices defining a second shape, wherein a first subset and a second subset of the first radiators of the further first antenna array are configured to operate at different polarizations, and wherein a first subset and a second subset of the second radiators of the further second antenna array are configured to operate at different polarizations.

19. The apparatus of claim 18, wherein at least one of in the second set of arrays, a radiator of the second radiators of the second set of arrays is within an area defined by the first shape of the further first antenna array of the second set of arrays, or wherein the first set of arrays partially overlaps the second set of arrays, wherein a radiator of the first set of arrays is within the area defined by the first shape of the second set of arrays.

20. A cellular base station, comprising:

an antenna apparatus, comprising:

a first antenna array comprising first radiators arranged at a plurality of vertices defining a first shape; and a second antenna array comprising second radiators arranged at a plurality of vertices defining a second shape, wherein a first subset and a second subset of the first radiators are configured to operate at different polarizations, wherein a first subset and a second subset of the second radiators are configured to operate at different polarizations, and wherein the first shape and the second shape partially overlap, wherein a radiator of the first radiators is within an area defined by the second shape, and one or more other radiators of the first radiators are outside the area defined by the second shape and the radiator of the first radiators within the area defined by the second shape is equidistant from the second radiators spread out to define the second shape to enable a narrow horizontal beamwidth and a high gain to be maintained; and wherein the different polarizations of the first subset and the second subset of the first radiators of the first array and the different polarizations of the first subset and the second subset of the second radiators of the second array are diagonally arranged relative to an elongate axis through the first antenna array and the second antenna array.

* * * * *